(12) United States Patent
Krellner et al.

(10) Patent No.: US 7,804,283 B2
(45) Date of Patent: Sep. 28, 2010

(54) MODE TRANSITIONING IN A DC/DC CONVERTER USING A CONSTANT DUTY CYCLE DIFFERENCE

(75) Inventors: Jan Krellner, Chandler, AZ (US); Sanjaya Maniktala, Gilbert, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 220 days.

(21) Appl. No.: 11/838,696

(22) Filed: Aug. 14, 2007
(Under 37 CFR 1.47)

(65) Prior Publication Data
US 2009/0045786 A1 Feb. 19, 2009

(51) Int. Cl.
*G05F 1/618* (2006.01)
(52) U.S. Cl. .................. 323/259; 323/225; 323/299
(58) Field of Classification Search .......... 323/259, 323/299, 225, 223, 224, 301
See application file for complete search history.

(56) References Cited

U.S. PATENT DOCUMENTS

| | | | | |
|---|---|---|---|---|
| 4,578,630 A | | 3/1986 | Grosch | |
| 5,734,258 A | * | 3/1998 | Esser | 323/224 |
| 6,166,527 A | * | 12/2000 | Dwelley et al. | 323/222 |
| 6,788,033 B2 | * | 9/2004 | Vinciarelli | 323/225 |
| 6,977,488 B1 | * | 12/2005 | Nogawa et al. | 323/271 |
| 6,989,657 B2 | | 1/2006 | Kirn | |
| 7,453,247 B2 | * | 11/2008 | de Cremoux | 323/285 |
| 2006/0012355 A1 | | 1/2006 | Prexl et al. | |

OTHER PUBLICATIONS

International Search Report and Written Opinion correlating to PCT/US2008/068034, dated Jan. 8, 2009.

* cited by examiner

*Primary Examiner*—Harry Behm
(74) *Attorney, Agent, or Firm*—Ingrasia, Fisher & Lorenz, P.C.

(57) ABSTRACT

According to an exemplary embodiment, a method includes the step (910) of driving a buck section of a DC/DC converter with a buck signal that has a buck duty cycle and concurrently with driving the buck section, driving a boost section of the DC/DC converter with a boost signal that has a boost duty cycle, a difference existing between the buck duty cycle and the boost duty cycle. The method also includes the step (920) of monitoring an input voltage that is coupled to the buck section for a change in the input voltage, and in response to a change in the input voltage, the step (930) of changing the buck duty cycle and the boost duty cycle such that the difference between the buck duty cycle and the boost duty cycle is substantially constant.

20 Claims, 5 Drawing Sheets

MODE TRANSITIONING IN A DC/DC CONVERTER USING A CONSTANT DUTY CYCLE DIFFERENCE

TECHNICAL FIELD

This disclosure relates generally to Direct Current to Direct Current (DC/DC) converters, and more particularly to mode transitioning in a DC/DC converter using a constant duty cycle difference.

BACKGROUND

The modes of operation for a conventional four switch, non-inverting, DC/DC buck-boost converter typically include a buck mode, a buck/boost mode, and a boost mode. In the buck mode, the switches nearest the input end of the DC/DC converter (the buck section) are switched using a Pulse Width Modulated (PWM) signal if the input is significantly greater than the output. In the boost mode, the switches nearest the output end of the DC/DC converter (the boost section) are switched using a PWM signal if the input is significantly less than the output. In a region between the buck and boost modes, where the input is close to the output and practical min/max duty cycle limits can affect pure buck or boost performance, the switches of the buck section are switched using a first PWM signal while the switches of the boost section are switched using a second PWM signal.

Conventionally, the control circuitry that drives the buck and boost sections of the converter uses different equations to generate the duty cycles for the buck and boost sections, depending on whether the input is rising or falling past the mode transition. Disadvantages associated with conventional DC/DC converters because of this technique include control circuitry that is relatively complex and glitches that occur in the output during mode transitions. Another disadvantage is that two different efficiency curves exist for the DC/DC converter, one for when the input is falling with respect to the output, and one for when the input is rising with respect to the output. It is therefore desirable to create a new DC/DC converter.

BRIEF DESCRIPTION OF THE DRAWINGS

Exemplary embodiments will hereinafter be described in conjunction with the following drawing figures, wherein like numerals denote like elements, and wherein.

DETAILED DESCRIPTION OF EXEMPLARY EMBODIMENTS

It would be desirable to have a DC/DC converter that had a reduced control circuit complexity, that could reduce output glitches, and that had complete retraceability—that is, the same performance regardless of whether the input is rising or falling with respect to the output. Exemplary embodiments achieve one or more of these goals, and may very well address other disadvantages of the conventional art that were not explicitly identified in the preceding background.

The following detailed description of exemplary embodiments is not intended to limit the invention or the application and uses of the invention. Furthermore, there is no intention to be bound by any expressed or implied theory presented in the preceding technical field, background, or the following detailed description of exemplary embodiments. Furthermore, other desirable features and characteristics of the invention will become apparent from the subsequent detailed description and the appended claims, taken in conjunction with the accompanying drawings and the foregoing technical field and background.

For simplicity and clarity of illustration, the drawing figures illustrate the general manner of construction, and descriptions and details of well-known features and techniques may be omitted to avoid unnecessarily obscuring certain aspects. Additionally, elements in the drawings figures are not necessarily drawn to scale. For example, the dimensions of some of the elements or regions in some of the figures may be exaggerated relative to other elements or regions of the same or other figures to help improve understanding of the exemplary embodiments.

The terms "first," "second," "third," "fourth" and the like in the description and the claims, if any, may be used for distinguishing between similar elements and not necessarily for describing a particular sequential or chronological order. It is to be understood that the terms so used are interchangeable under appropriate circumstances such that the embodiments described herein are, for example, capable of use in sequences other than those illustrated or otherwise described herein. Furthermore, the terms "comprise," "include," "have" and any variations thereof, are intended to cover non-exclusive inclusions, such that a process, method, article, or apparatus that comprises, includes, or has a list of elements is not necessarily limited to those elements, but may include other elements not expressly listed or inherent to such process, method, article, or apparatus. The terms "left," "right," "in," "out," "front," "back," "up," "down, "top," "bottom," "over," "under," "above," "below" and the like in the description and the claims, if any, are used for describing relative positions and not necessarily for describing permanent or absolute positions in space. It is to be understood that the exemplary embodiments described herein may be used, for example, in other orientations than those illustrated or otherwise described herein. For purposes of this disclosure, the word "exemplary" means "example" as opposed to "model."

Figure 1:
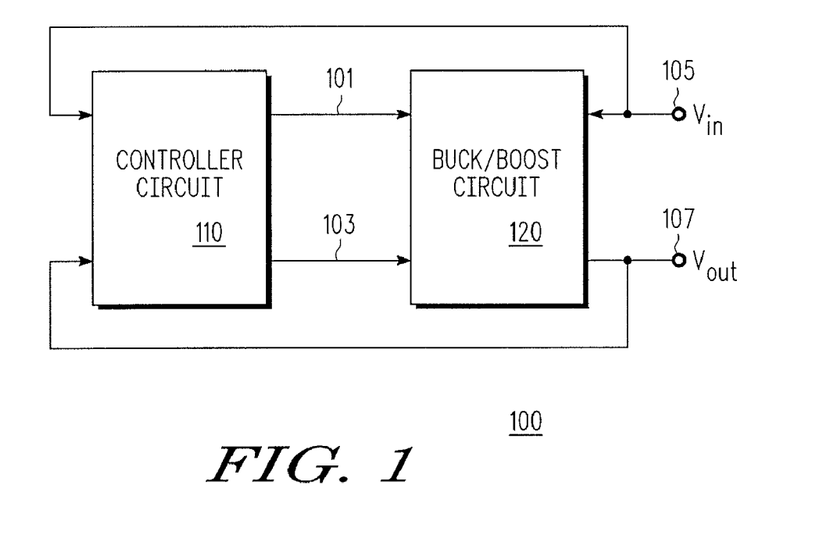
FIG. 1 is a simplified block diagram illustrating a DC/DC converter according to exemplary embodiments.

FIG. 1 is a simplified block diagram illustrating a DC/DC converter 100 according to some exemplary embodiments. The DC/DC converter 100 suitably includes an input node 105, an output node 107, a controller circuit 110, and a buck/boost circuit 120. The input node 105 is tied to inputs of both the controller circuit 110 and the buck/boost circuit 120. The output node 107 is tied to an output of the buck/boost circuit 120 and to an input of the controller circuit 110.

When an input voltage $V_{in}$ is applied to the input node 105, the DC/DC converter is operable to generate an output voltage $V_{out}$ at the output node 107. For many, if not all, portable consumer electronics applications where the input voltage $V_{in}$ is obtained from a battery, it is desirable to maintain $V_{out}$ at a constant value over the entire range of $V_{in}$.

Based at least upon an input voltage $V_{in}$ that is applied to the input node 105, the controller circuit 110 is operable to generate a buck driving signal 101 and a boost driving signal 103 that are used to drive the buck/boost circuit 120. According to some exemplary embodiments, the controller circuit 110 generates the duty cycles for the buck driving signal 101 and the boost driving signal 103 such that a difference between a duty cycle of the buck driving signal and a duty cycle of the boost driving signal is maintained substantially constant throughout a buck/boost mode of operation for the DC/DC converter. That is, even though the duty cycles for the buck driving signal and the boost driving signal 101, 103 may both be changing over a range of values of the input voltage $V_{in}$, the duty cycle difference is maintained to be substantially constant throughout the range of values.

Figure 2:
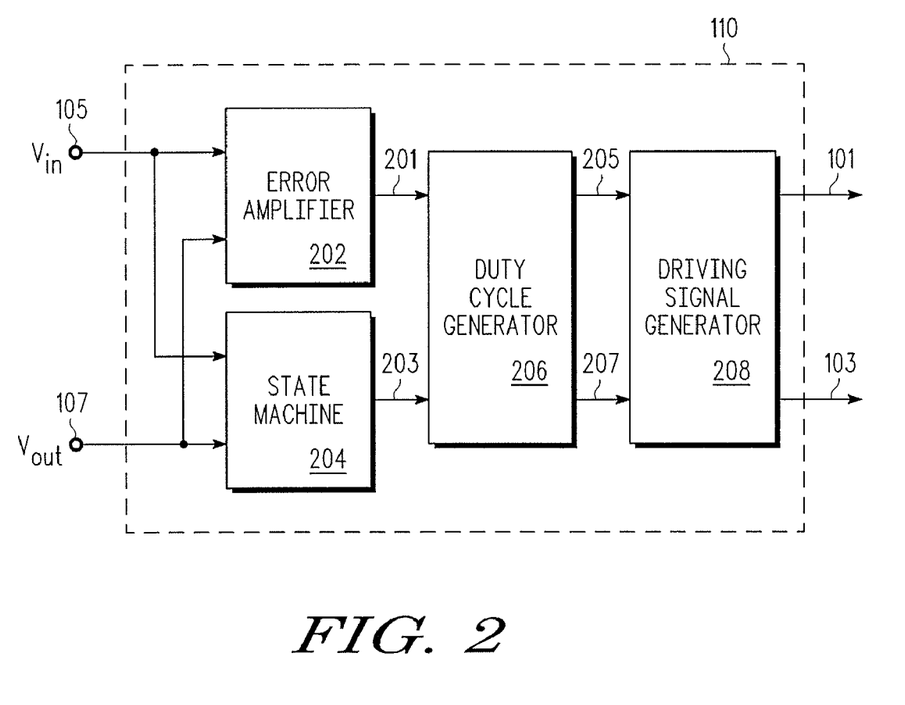
FIG. 2 is a simplified block diagram that further illustrates the controller circuit of FIG. 1 according to some exemplary embodiments.

There are a variety of designs that are suitable for implementing the controller circuit 110. FIG. 2 is a simplified block diagram that further illustrates the controller circuit 110 of FIG. 1 according to some exemplary embodiments. Referring to FIG. 2, the controller circuit 110 suitably includes an error amplifier 202, a state machine 204, a duty cycle generator 206, and a driving signal generator 208.

The input node 105, which carries the input voltage $V_{in}$, is coupled to an input of the error amplifier 202 and to an input of the state machine 204. The output node 107, which carries the output voltage $V_{out}$, is also coupled to an input of the error amplifier 202 and to an input of the state machine 204. Based at least upon the input voltage $V_{in}$ and the output voltage $V_{out}$, the error amplifier 202 generates a COMP signal 201 at an output of the error amplifier, which is coupled to an input of the duty cycle generator 206. Based at least upon the input voltage $V_{in}$ and the output voltage $V_{out}$, the state machine 204 generates a MODE signal 203 at an output of the state machine, which is also coupled to an input of the duty cycle generator 206. In response to at least the COMP signal 201 and the MODE signal 203, the duty cycle generator 206 produces a buck duty cycle signal "$D_{Buck}$" 205 and a boost duty cycle signal "$D_{Boost}$" 207 at outputs of the duty cycle generator. $D_{Buck}$ 205 and $D_{Boost}$ 207 are coupled to inputs of the driving signal generator 208. The driving signal generator 208 produces the buck driving signal 101 and the boost driving signal 103 at outputs of the driving signal generator based at least upon $D_{Buck}$ 205 and $D_{Boost}$ 207.

Figure 3:
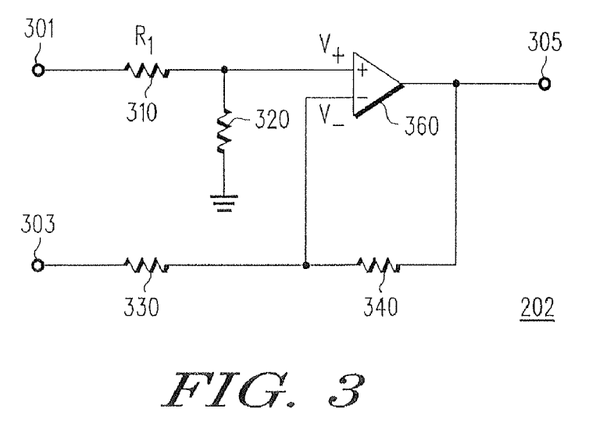
FIG. 3 is a circuit-level diagram that further illustrates the error amplifier of FIG. 2 according to an exemplary embodiment.

FIG. 3 is a circuit diagram that further illustrates the error amplifier 202 of FIG. 2 according to an exemplary embodiment. Referring to FIG. 3, the error amplifier 202 suitably includes an operational amplifier (op-amp) 360 and resistors 310, 320, 330, and 340 that are connected in the manner that is shown. The op-amp 360 and resistors 310-340 are arranged in a differential amplifier configuration that amplifies the difference between the voltages V+ and V− that appear at the non-inverting and inverting inputs, respectively, of the op-amp 360. In one embodiment, the resistors 310 and 330 have substantially equal resistance values and the resistors 320 and 340 have substantially equal resistance values. In this case, the op-amp 360 is operable to generate a voltage at node 305 that is equivalent to the difference between the voltage at node 301 and the voltage at node 303, multiplied by the ratio between the resistances of resistor 340 and 330. This is expressed in equation 1 below.

$$V_{(node\ 305)} = [V_{(node\ 301)} - V_{(node\ 303)}][R_{(resistor\ 340)}/R_{(resistor\ 330)}] \quad (1)$$

The error amplifier 202 is operable to produce the COMP signal 201 at node 305 when the output voltage $V_{out}$ is applied to node 301 and the input voltage $V_{in}$ is applied to node 303. Using equation 1, the expression for the COMP signal 201 in terms in terms of the input voltage $V_{in}$ and the output voltages appears below in equation 2.

$$COMP = (V_{out} - V_{in})[R_{(resistor\ 340)}/R_{(resistor\ 330)}] \quad (2)$$

The resistance values for the resistors 310, 320, 330, and 340 are design choices, and may be determined based upon the specific value for the output voltage $V_{out}$, the range of values for the input voltage $V_{in}$, or on predetermined transition points between the buck, boost, and buck/boost modes of operation. The particular design of error amplifier 202 illustrated in FIG. 3 is merely an example, and other designs exist that are suitable for implementing other exemplary embodiments.

Figure 4:
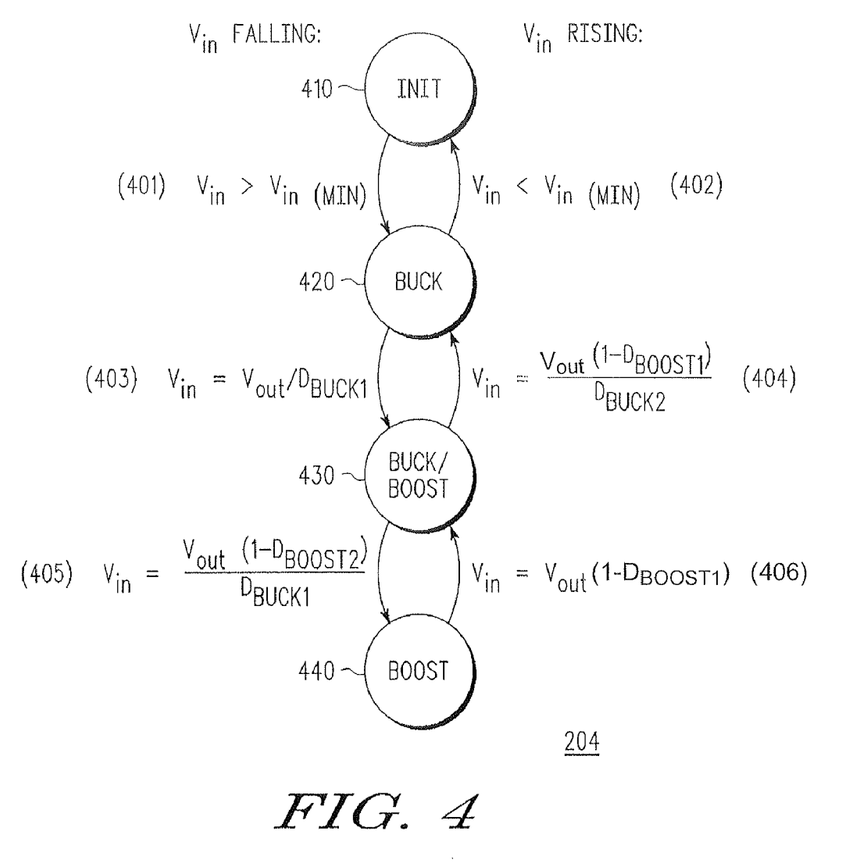
FIG. 4 is a state diagram that further illustrates the state machine of FIG. 2 according to an exemplary embodiment.

FIG. 4 is a state diagram that further illustrates the state machine 204 of FIG. 2 according to an exemplary embodiment. Referring to FIG. 4, the state machine 204 has four modes: an initial state 410, a buck state 420, a buck/boost state 430, and a boost state 440. There is an equation associated with each transition between states, the equation determining the value of the input voltage $V_{in}$ at which the transition between states occurs. The equations 401, 403, and 405 address the cases when the input voltage $V_{in}$ is falling relative to the output voltage $V_{out}$. The equations 402, 404, and 406 address the alternative when the input voltage $V_{in}$ is rising relative to the output voltage $V_{out}$.

In equations 401 and 402, $V_{in(min)}$ represents the minimum input voltage $V_{in}$ that can be used to obtain the output voltage $V_{out}$. In equations 403-406, $D_{Buck1}$, $D_{Buck2}$, $D_{Boost1}$, and $D_{Boost2}$ are predetermined constants that represent duty cycle limits for the buck and boost sections during the buck/boost mode. Specifically, $D_{Buck1}$ is the upper limit for the buck duty cycle in the buck/boost mode, $D_{Buck2}$ is the lower limit for the buck duty cycle in the buck/boost mode, $D_{Boost1}$ is the lower limit for the boost duty cycle in the buck/boost mode, and $D_{Boost2}$ is the upper limit for the boost duty cycle in the buck/boost mode. For example, if $D_{Buck1}$ and $D_{Buck2}$ were 0.9 and 0.798, respectively, this would indicate that the duty cycle for the buck section ranges between 90% and 79.8% during the buck/boost mode of operation. Likewise, if $D_{Boost1}$ and $D_{Boost2}$ were 0.1 and 0.202, respectively, this indicates that the duty cycle for the boost section ranges between 10% and 20.2% during the buck/boost mode of operation. Generally speaking, $D_{Buck1}$, $D_{Buck2}$, $D_{Boost1}$, and $D_{Boost2}$ are chosen such that $D_{Buck1} + D_{Boost1} = 1$, and $D_{Buck2} + D_{Boost2} = 1$.

The initial state 410 is representative of when the input voltage $V_{in}$ is applied or removed from the DC/DC converter 100, for example, when a small electronic device that includes the DC/DC converter 100 and a fully charged battery is first turned on. The state machine 204 determines that the input voltage $V_{in}$ is greater than $V_{in(min)}$, and transitions to the buck state 420. Likewise, if the state machine 204 were in the buck state 420 and the input voltage $V_{in}$ was removed or fell below the $V_{in(min)}$ threshold, the state machine would return to the initial state 410.

State machine 204 monitors the input voltage $V_{in}$ as it rises and falls, transitions to different states when $V_{in}$ fulfills the transition points represented by equations 401-406, and outputs the MODE signal 203, which is indicative of whether the state machine 204 is in the buck state 420, the buck/boost state 430, or the boost state 440. To further illustrate what the actual transition points between the states 420, 430, and 440 may look like, example values of 0.9, 0.798, 0.1, and 0.202 may be substituted for $D_{Buck1}$, $D_{Buck2}$, $D_{Boost1}$, and $D_{Boost2}$, respectively, in equations 403-406. Using these example values, equation 403 becomes (1.11) $V_{out}$, equation 404 becomes (1.13) $V_{out}$, equation 405 becomes (0.89) $V_{out}$, and equation 406 becomes (0.90) $V_{out}$. Thus, when the input voltage $V_{in}$ is falling relative to the output voltage $V_{out}$, the state machine 204 transitions from the buck state 420 to the buck/boost state 430 when $V_{in}$ is about 111% of $V_{out}$, and transitions from the buck/boost state to the boost state 440 when $V_{in}$ is about 89% of $V_{out}$. Similarly, when the input voltage $V_{in}$ is rising relative to the output voltage $V_{out}$, the state machine 204 transitions from the boost state 440 to the buck/boost state 430 when $V_{in}$ is about 90% of $V_{out}$, and transitions from the buck/boost state to the buck state 420 when $V_{in}$ is about 113% of $V_{out}$.

Equations 403-406 may alternatively be rearranged to express a ratio between the output voltage $V_{out}$ and the input voltage $V_{in}$. Thus, in some embodiments state machine 204 may be operable to monitor a ratio between the output voltage $V_{out}$ and the input voltage $V_{in}$, and transition between the states depending on the values of the ratio.

State machine 204 is just one example of a state machine that could be used to implement exemplary embodiments. Other suitable state machines may use different logic or equations to determine the transitions between modes. Additionally, since the details involved with implementing the state machine 204 or other similar state machines with actual hardware are well known and not required for an understanding of exemplary embodiments, a detailed circuit level diagram of the state machine 204 is omitted.

Figure 5:
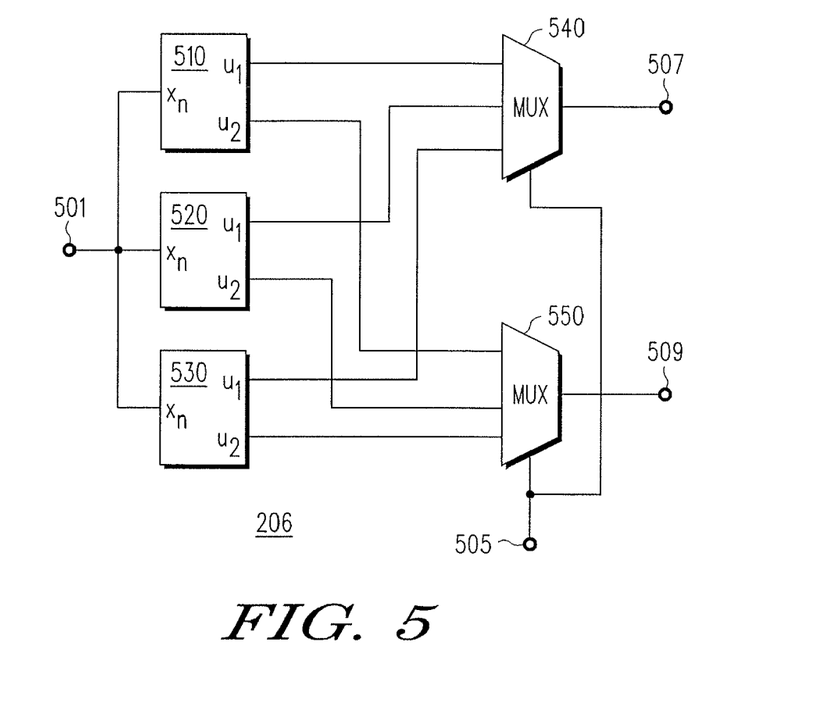
FIG. 5 is a circuit-level diagram that further illustrates the duty cycle generator of FIG. 2 according to an exemplary embodiment.

FIG. 5 is a circuit-level diagram that further illustrates the duty cycle generator 206 of FIG. 2. Referring to FIG. 5, the duty cycle generator suitably includes generator 510, generator 520, generator 530, and Analog Multiplexers 540, 550. The COMP signal 201 from the error amplifier 202 of FIG. 2 is applied to the node 501, which is coupled to the inputs of the generators 510, 520, 530. The MODE signal 203 from the state machine 204 of FIG. 2 is applied to the node 505, which is coupled to the selection inputs of the AMUX 540 and the AMUX 550.

Each of the generators 510, 520, 530 is operable to periodically sample, at input $x_n$, the signal that is applied to the node 501 to obtain inputs $x_1, X_2, X_3, \ldots, x_N$. After each sample, the generators 510, 520, 530 calculate the outputs u1 and u2, which are functions of the input $x_n$. The outputs u1 from each of the generators 510, 520, 530 are applied to the inputs of the AMUX 540, while the outputs u2 from each of the generators are applied to the inputs of the AMUX 550. Depending on the state of the MODE signal 203 that is applied to the AMUX 540 and AMUX 550 through the node 505, the AMUX 540 and 550 are operable to select the u1 and u2 outputs from a single one of the generators 510, 520, 530.

For example, when the state machine 204 is in the buck state, AMUX 540 is controlled to cause the u1 output from generator 510 to appear at node 507, and AMUX 550 is controlled to cause the u2 output from generator 510 to appear at node 509. When the state machine 204 is in the buck/boost state, AMUX 540 and 550 are controlled to cause the u1 and u2 outputs from generator 520 to appear at nodes 507 and 509, respectively. Similarly, when the state machine 204 is in the boost state, AMUX 540 and 550 are controlled to cause the u1 and u2 outputs from the generator 530 to appear at nodes 507 and 509, respectively. The u1 and u2 signals that appear at the nodes 507 and 509 are output from the duty cycle generator 206 as the buck duty cycle signal $D_{Buck}$ 205 and the boost duty cycle signal $D_{Boost}$ 207, respectively.

When the state machine 204 is in the buck state 420, the outputs u1 and u2 from generator 510 are used as the buck duty cycle signal $D_{Buck}$ 205 and the boost duty cycle signal $D_{Boost}$ 207, respectively. According to some exemplary embodiments, the output u2 from generator 510 is substantially equal to zero $x_n$ (u1=$x_n$) for all values of the input $x_n$. Accordingly, when the state machine 204 is in the buck state 420, the boost duty cycle signal $D_{Boost}$ 207 is substantially equal to zero. Conversely, according to some embodiments the output u1 from generator 510 is substantially equal to $x_n$ (u1=$x_n$) for all values of the input $x_n$. Thus, when the state machine 204 is in the buck state 420, the buck duty cycle signal $D_{Buck}$ 205 is substantially equal to $x_n$.

When the state machine 204 is in the boost state 440, the outputs u1 and u2 from generator 530 are used as the buck duty cycle signal $D_{Buck}$ 205 and the boost duty cycle signal $D_{Boost}$ 207, respectively. According to some exemplary embodiments, the output u1 from generator 530 is substantially equal to one (u1=1) for all values of the input $x_n$. Accordingly, when the state machine 204 is in the boost state 440, the buck duty cycle signal $D_{Buck}$ 205 is substantially equal to 1, or 100%. Conversely, according to some embodiments the output u2 from generator 530 is substantially equal to $1-1/x_n$ (u2=$1-1/x_n$) for all values of the input $x_n$. Thus, when the state machine 204 is in the boost state 440, the boost duty cycle signal $D_{Boost}$ is substantially equal to $1-1/x_n$.

When the state machine 204 is in the buck/boost state 430, the outputs u1 and u2 from the generator 520 are used as the buck duty cycle signal $D_{Buck}$ 205 and the boost duty cycle signal $D_{Boost}$ 207, respectively. According to exemplary embodiments, when the state machine 204 is in the buck/boost state, a difference between u1 and u2 is maintained substantially constant for all values of the input $x_n$. Thus, in the buck/boost region of operation the output u1 is a function of $x_n$ and the output u2 differs from u1 by only a constant, C. These relationships are expressed in equations 3 and 4. Equation 5 is obtained by substituting equation 3 into equation 4.

$$u1 = f(x_n) \tag{3}$$

$$u2 = u1 - C \tag{4}$$

$$u2 = f(x_n) - C \tag{5}$$

According to exemplary embodiments, the outputs u1 and u2 are further defined in equations 6 and 7.

$$u1 = f(x_n) = [1 + (D_{Buck(start)} - D_{Boost(start)})] \cdot [x_n/(1+x_n)] \tag{6}$$

$$u2 = u1 - (D_{Buck(start)} - D_{Boost(start)}) \tag{7}$$

$D_{Buck(start)}$ and $D_{Boost(start)}$ are the initial starting values for the buck duty cycle and the boost duty cycle in the buck/boost mode, and their particular values depend upon whether the state machine 204 is transitioning from the buck mode to the buck/boost mode or from the boost mode to the buck/boost mode.

At the buck to buck/boost transition, the values for $D_{Buck(start)}$ and $D_{Boost(start)}$ in equations 6 and 7 are given by equations 8 and 9 below.

$$D_{Buck(start)} = x_{(n-1)} \cdot (1 - D_{Boost}) \tag{8}$$

$$D_{Boost(start)} = D_{Boost1} \tag{9}$$

In equation 8, the term $x_{(n-1)}$ represents the last value of x from the buck mode (the sample immediately before the transition), while the term $D_{Boost1}$ in equations 8 and 9 is the predetermined lower limit for the boost duty cycle in the buck/boost mode.

At the boost to buck/boost transition, the values for $D_{Buck(start)}$ and $D_{Boost(start)}$ in equations 6 and 7 are given by equations 10 and 11 below.

$$D_{Buck(start)} = D_{Buck1} \quad (10)$$

$$D_{Boost(start)} = 1 - (D_{Buck1}/x_{(n-1)}) \quad (11)$$

In equation 11, the term $x_{(n-1)}$ represents the last value of x from the boost mode (the sample immediately before the transition), while the term $D_{Buck1}$ in equations 10 and 11 is the predetermined upper limit for the buck duty cycle in the buck/boost mode.

Figure 6:
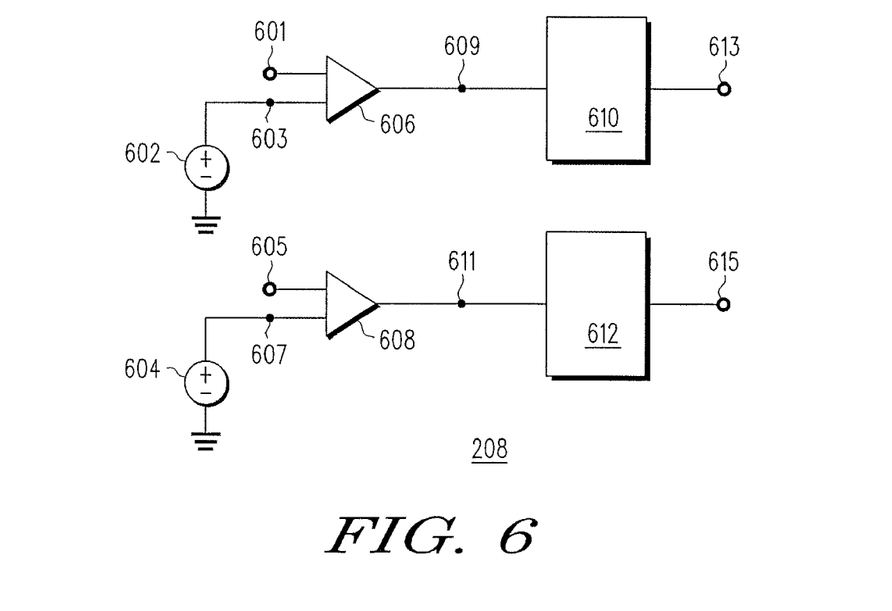
FIG. 6 is a circuit-level diagram that further illustrates the driving signal generator of FIG. 2 according to an exemplary embodiment.

FIG. 6 is a circuit-level diagram that further illustrates the driving signal generator 208 of FIG. 2 according to an exemplary embodiment. The driving signal generator 208 suitably includes ramp voltage generator 602, ramp voltage generator 604, comparator 606, comparator 608, start/stop logic circuit 610, and start/stop logic circuit 612. Nodes 601, 603 are coupled to the inputs of comparator 606, while nodes 605, 607 are coupled to the inputs of comparator 608. The output of the comparators 606 and 608 are coupled to an input of the start/stop logic circuits 610 and 612, respectively, at nodes 609 and 611.

The ramp voltage generators 602, 604, are operable to generate a voltage signal that has a known characteristic, e.g., a periodic saw-tooth voltage waveform that rises at a constant rate from 0 V to 1 V over a known rise time. The comparator 606 is operable to generate a signal at node 609 that is at logic "0" when the signal applied to the input at node 601 is less than the ramp voltage at node 603. Likewise, the comparator 608 is operable to generate a signal at node 611 that is at logic "0" when the voltage applied to the input at node 605 is less than the ramp voltage at node 607. On the other hand, the comparators 606, 608 are operable to generate a signal at nodes 609, 611 that is at logic "1" when the voltage applied to the inputs at nodes 601, 605 is greater than the ramp voltages at nodes 603, 607. Thus, the comparators 606, 608 are operable to generate Pulse-Width Modulated (PWM) signals at nodes 609, 611 that are dependent upon the input signals at nodes 601, 605.

The buck duty cycle signal $D_{Buck}$ 205 from the duty cycle generator 206 is preferably applied to the input of comparator 606 at node 601, while the boost duty cycle signal $D_{Boost}$ 207 from the duty cycle generator 206 is preferably applied to the input of comparator 608 at node 605. As the voltage level of the buck duty cycle signal $D_{Buck}$ 205 and the boost duty cycle signal $D_{Boost}$ 207 increase, $D_{Buck}$ and $D_{Boost}$ become greater than the ramp voltage at nodes 603 and 607 for a proportionally greater portion of a cycle, and the duty cycle for the PWM signals at nodes 609 and 611 increases. As the voltage level of the buck duty cycle signal $D_{Buck}$ 205 and the boost duty cycle signal $D_{Boost}$ 207 decrease, $D_{Buck}$ and $D_{Boost}$ become less than the ramp voltage at nodes 603 and 607 for a proportionally smaller portion of a cycle, and the duty cycle for the PWM signals at nodes 609 and 611 decreases. In this manner, $D_{Buck}$ 205 and $D_{Boost}$ 207 can be used to directly control the duty cycle of the PWM signals at nodes 609 and 611.

The PWM signals at nodes 609 and 611 are applied to an input of the start/stop logic circuits 610 and 612, respectively. The start/stop logic circuit 610 is operable to cause the PWM signal at node 609 to appear as the buck driving signal 101 at node 613, and the start/stop logic circuit 612 is operable to cause the PWM signal at node 611 to appear as the boost driving signal 103 at node 615.

In the following paragraphs, the buck/boost circuit 120 of FIG. 1 is described in greater detail. Like the controller circuit 110 of FIG. 1, there are a variety of designs that are suitable for implementing the buck/boost circuit 120. In one exemplary embodiment, which is described in further detail below, the buck/boost circuit 120 preferably has a non-inverting, four-switch, single inductor configuration. In alternative embodiments, other designs for a buck/boost circuit 120 may be used.

Figure 7:
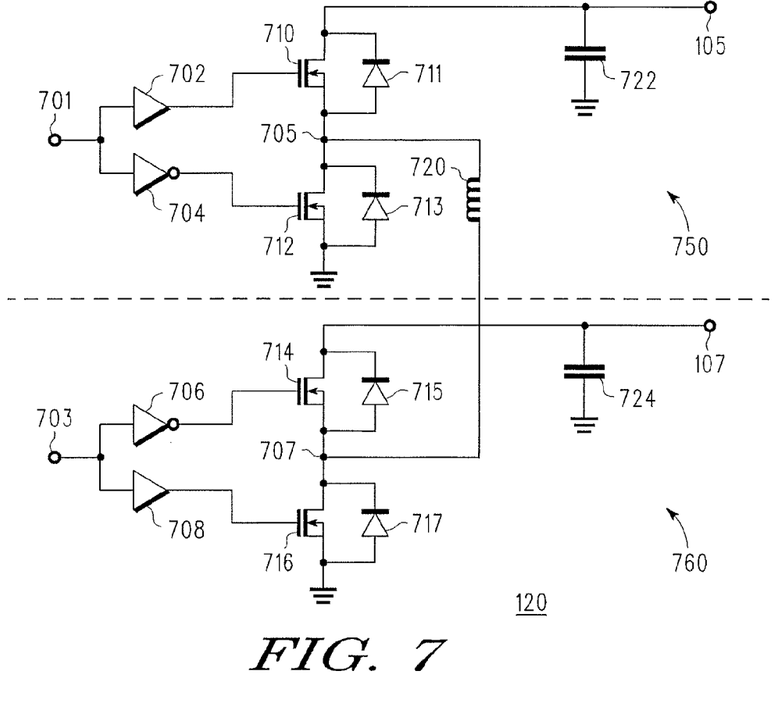
FIG. 7 is a circuit-level diagram that further illustrates the buck/boost circuit of FIG. 1 according to an exemplary embodiment.

FIG. 7 is a circuit-level diagram that further illustrates the buck/boost circuit 120 of FIG. 1 according to an exemplary embodiment. Referring to FIG. 7, the buck/boost circuit 120 suitably includes buffers 702 and 708, inverting buffers 704 and 706, Field Effect Transistors (FETs) 710, 712, 714, and 716, Zener diodes 711, 713, 715, and 717, inductor 720, and capacitors 722 and 724. In operation, the input voltage $V_{in}$ is applied to the node 105 and the output voltage $V_{out}$ appears at node 107. The buck driving signal 101 is applied to the buck/boost circuit 120 at node 701, while the boost driving signal 103 is applied to the buck/boost circuit 120 at node 703.

The portion of the buck/boost driving circuit 120 that is coupled to the input voltage $V_{in}$ at node 105 may be referred to as the buck section 750, while the portion of the buck/boost driving circuit 120 that is coupled to the output voltage $V_{out}$ at node 107 may be referred to as the boost section 760. The buck section 750 and the boost section 760 are coupled to each other via the inductor 720, which is coupled between nodes 705 and 707.

The node 701, which is coupled to the inputs of the buffer 702 and the inverting buffer 704, is preferably connected to the buck driving signal 101. The output of buffer 702 is coupled to the gate of FET 710, which is the control FET for the buck section 750. The output of inverting buffer 704 is coupled to the gate of FET 712. The node 703, which is coupled to the inputs of the inverting buffer 706 and the buffer 708, is preferably connected to the boost driving signal 103. The output of buffer 708 is coupled to the gate of FET 716, which is the control FET for the boost section 760. The output of inverting buffer 706 is coupled to the gate of FET 714. Each one of the FETs 710, 712, 715, 717 is coupled in parallel with a corresponding one of the Zener diodes 711, 713, 715, 717, which stabilizes the voltage across the FETs.

In operation, the buck section 750 is driven by the buck driving signal 101 that is applied at node 701, and the boost section 760 is driven by the boost driving signal 103 that is applied at node 703. As was explained above, the buck driving signal 101 is a PWM signal having a duty rate that is determined by the buck duty cycle signal $D_{Buck}$ 205, and the boost driving signal 103 is a PWM signal having a duty rate that is determined by the boost duty cycle signal $D_{Boost}$ 207. As the input voltage $V_{in}$ at node 105 varies, the controller circuit 110 modifies the duty cycle of the buck driving signal 101 and the duty cycle of the boost driving signal 103 by changing the voltage level of the buck duty cycle signal $D_{Buck}$ 205 and the boost duty cycle signal $D_{Boost}$ 207, which are output from the duty cycle generator 206. According to exemplary embodiments, the buck driving signal 101 and the boost driving signal 103 are controlled in the buck/boost region of operation such that the duty cycle difference between the buck driving signal and the boost driving signal remain constant even as the buck driving signal and the boost driving signal themselves vary as a function of the input voltage $V_{in}$.

Figure 8:
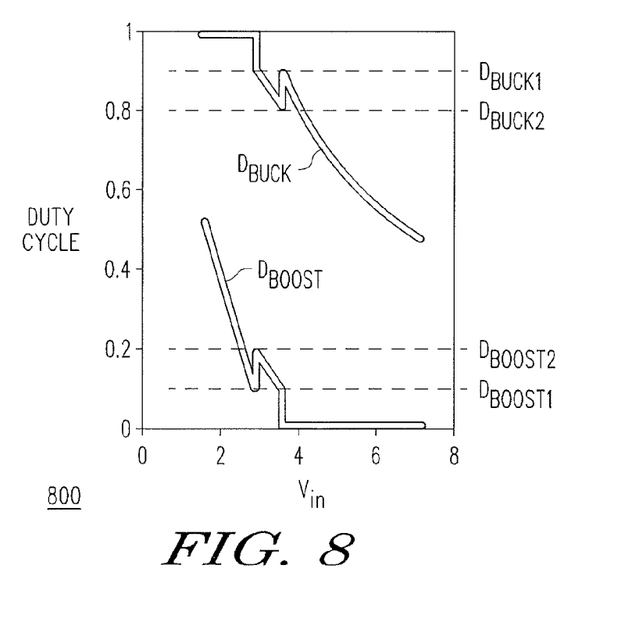
FIG. 8 is a graph illustrating the duty cycle of the buck driving signal and the boost driving signal for the buck/boost circuit of FIG. 7 as a function of the input voltage $V_{in}$.

FIG. 8 is a graph 800 illustrating the duty cycle of the buck driving signal 101 and the boost driving signal 103 for the buck/boost circuit 120 of FIG. 7 as a function of the input voltage $V_{in}$. Recall from the discussion above (see, e.g., equation 2) that, generally speaking, the COMP signal 201 is a function of the difference between the output voltage $V_{out}$ and the input voltage $V_{in}$, multiplied by a constant that depends upon the particular feedback network that is used to implement the error amplifier 202. Further recall that the COMP signal 201 generated by the error amplifier 202 is applied to node 501 of the duty cycle generator 206, which generates the buck duty cycle signal $D_{Buck}$ 205 and the boost duty cycle signal $D_{Boost}$. As explained above, the buck duty cycle signal $D_{Buck}$ 205 and the boost duty cycle signal $D_{Boost}$ control the duty cycle of the buck driving signal 101 and the boost driving signal 103. Thus, the buck driving signal 101 and the boost driving signal 103 are functions of the input voltage $V_{in}$.

Referring now to FIG. 8, the operation of the buck/boost circuit 120 of FIG. 7 will be described. Assume that the input voltage $V_{in}$ initially is at the upper limit of its range (e.g., about 7 V as shown in FIG. 8), and begins to fall towards the output voltage $V_{out}$, which in this embodiment is approximately 3.3 V. Alternative embodiments, of course, may have different desired values for $V_{out}$. As the input voltage $V_{in}$ begins to fall from 7 V, the buck/boost circuit 120 is initially in the buck mode, where the duty cycle for the boost driving signal 103 is substantially zero and the duty cycle of the buck driving signal 101 increases as the difference between $V_{out}$ and $V_{in}$ ($V_{out}-V_{in}$) decreases.

The duty cycle of the buck driving signal 101 continues to increase until it hits $D_{Buck1}$, the predetermined upper limit of the buck duty cycle in the buck/boost mode. In this case, $D_{Buck1}$ was set to be 90%. At this transition between the buck mode and the buck/boost mode, the duty cycle of the boost driving signal 103 is turned on to 10%, or $D_{Boost1}$, the predetermined lower limit for the boost duty cycle in the buck/boost mode. This causes the buck duty cycle signal $D_{Buck}$ to decrease suddenly by almost 10%, in keeping with equation 8. Thereafter, as the difference between $V_{out}$ and $V_{in}$ decreases further, the duty cycle difference between the buck driving signal 101 and the boost driving signal 103 is kept fixed. As $V_{in}$ continues to fall through the buck/boost region, the duty cycle of the buck driving signal 101 and the duty cycle of the boost driving signal 103 increase equally, as indicated by equation 4.

Eventually, the duty cycle of the buck driving signal 101 reaches 90% again, and at this moment the duty cycle of the boost driving signal 103 has increased to 20%. At this point marking the transition between the buck/boost mode and the boost mode, the duty cycle of the buck driving signal 101 is turned fully on (100% or 1). At this transition point, since the duty cycle of the buck driving signal 101 increases suddenly by 10% (from 90% to 100%), the duty cycle of the boost driving signal 103 decreases correspondingly, from 20% to 10%. Thus, regulation is ensured and no minimum or maximum duty cycle limits are breached. Thereafter, in the boost mode, as the difference between $V_{out}$ and $V_{in}$ decreases further, the duty cycle of the boost driving signal 103 increases until $V_{in(min)}$ is encountered, at which point the IC may be switched off.

In the above paragraphs, it was assumed that the input voltage $V_{in}$ was falling. However, according to the exemplary embodiments if the input voltage $V_{in}$ were rising, the duty cycles of the buck driving signal and the boost driving signal would follow the same plots illustrated in FIG. 8. Thus, the performance of the DC/DC converter is the same regardless of whether the input is rising or falling, which results in a single efficiency curve for the DC/DC converter.

Figure 9:
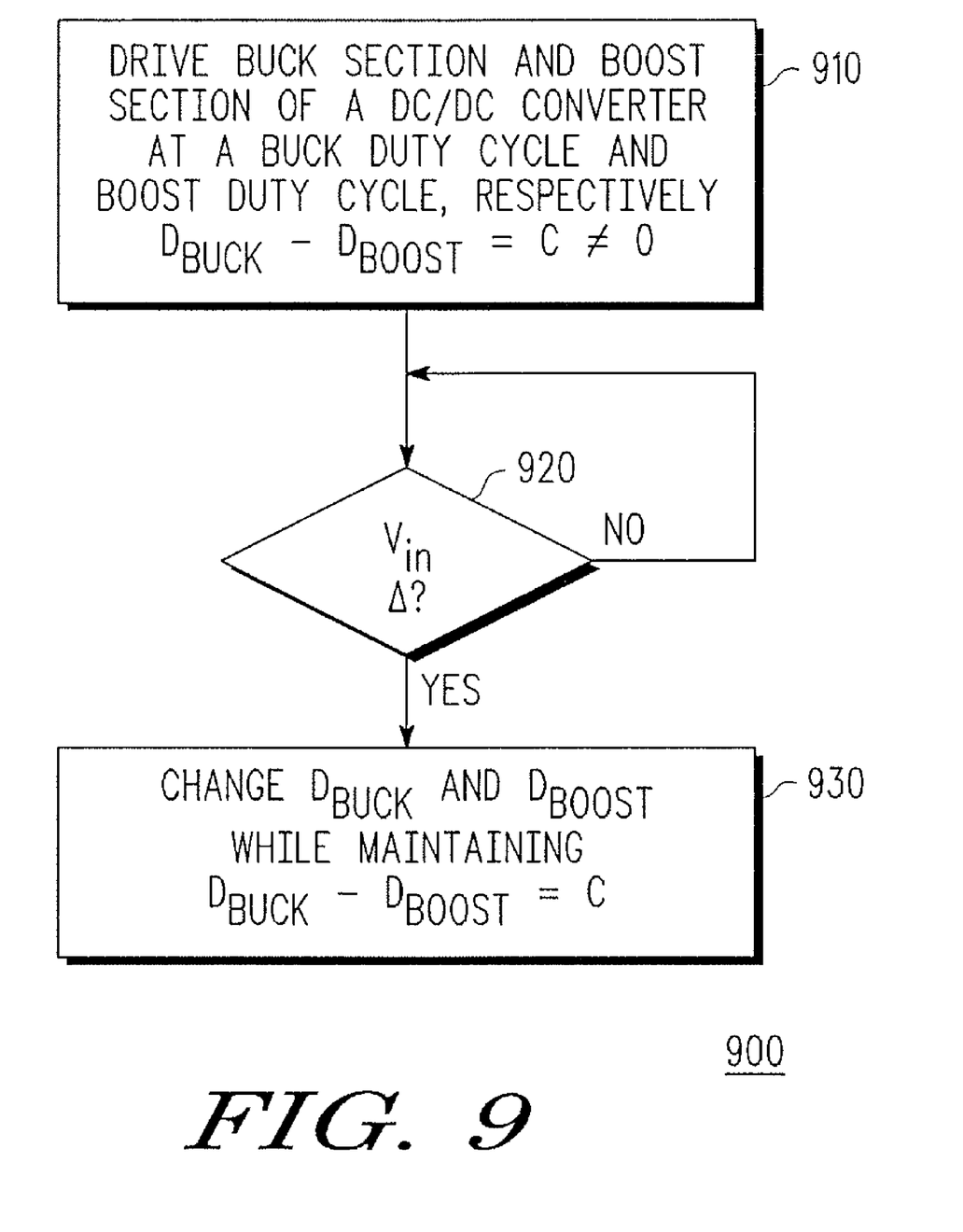
FIG. 9 is a flow chart illustrating some processes included in a method according to an exemplary embodiment.

FIG. 9 is a flow chart illustrating some processes included in a method 900 according to an exemplary embodiment. At process 910, a buck section of a DC/DC converter is driven using a PWM signal having a buck duty cycle $D_{Buck}$, while a boost section of the DC/DC converter is driven using a PWM signal having a boost duty cycle $D_{Boost}$. According to the exemplary embodiment, there is a non-zero difference, C, between $D_{Buck}$ and $D_{Boost}$. At process 920, an input voltage Vin that is coupled to the buck section is monitored for changes. If a change is detected in the input voltage Vin, at process 930 the buck duty cycle $D_{Buck}$ and the boost duty cycle $D_{Boost}$ are changed to maintain the output voltage of the DC/DC converter at the desired level, but they are changed such that the difference between $D_{Buck}$ and $D_{Boost}$ is maintained at C.

In one embodiment, a method of mode transitioning comprises the steps of: driving a buck section of a DC/DC converter with a buck signal that has a buck duty cycle; concurrently with driving the buck section, driving a boost section of the DC/DC converter with a boost signal that has a boost duty cycle, a difference existing between the buck duty cycle and the boost duty cycle; monitoring an input voltage that is coupled to the buck section for a change in the input voltage; in response to a change in the input voltage, changing the buck duty cycle and the boost duty cycle such that the difference between the buck duty cycle and the boost duty cycle is substantially constant. Another embodiment further includes maintaining the difference between the buck duty cycle and the boost duty cycle as substantially constant for a range of values of the input voltage. In one embodiment, the buck duty cycle comprises a substantially linear function of the input voltage over the range of values. In another, the boost duty cycle comprises a substantially linear function of the input voltage over the range of values. The buck section may further determine that the ratio is substantially within the range of values, and driving the boost section may include determining that the ratio is substantially within the range of values. In one embodiment, the substantially linear function of the input voltage is the same regardless of whether the ratio has an increasing trend or a decreasing trend.

A DC/DC converter in accordance with one embodiment includes: a buck section, the buck section configured to receive an input voltage; an inductor coupled to the buck section; a boost section coupled to the inductor; and a controller coupled to the buck and boost sections, the controller configured to drive the buck section and the boost section during a buck/boost mode of operation such that a difference between a buck duty cycle and a boost duty cycle is substantially constant over a range of values of the input voltage. The controller may be configured to drive the buck section and the boost section such that the buck duty cycle and the boost duty cycle are not substantially constant over the range of values of the input voltage. In one embodiment, the buck duty cycle and the boost duty cycle are functions of the input voltage over the range of values. The controller may comprise a driving signal generator coupled to the buck and boost sections, the driving signal generator operable to generate a buck driving signal in response to a buck duty cycle signal and a boost driving signal in response to a boost duty cycle signal. In another, the controller further comprises a duty cycle generator coupled to the driving signal generator, the duty cycle generator operable to generate the buck duty cycle signal and the boost duty cycle signal in response to a mode signal and a comp signal. The controller may further comprise a state machine coupled to the duty cycle generator, the state machine operable to generate the mode signal in response to the input voltage and an output voltage. The controller may further comprise an error amplifier coupled to the duty cycle generator, the error amplifier operable to generate the comp signal in response to the input voltage and the output voltage.

A DC/DC converter circuit for converting an input voltage applied at an input node to an output voltage at an output node includes: a buck section coupled to the input node; an inductor having a first end and a second end, the first end of the inductor coupled to the buck section; a boost section coupled to a second end of the inductor; and a controller coupled to the buck section and the boost section, the controller configured to drive the buck section and the boost section such that a difference between a buck duty cycle and a boost duty cycle remains substantially constant over a range of values for the input voltage. The controller may be operable to drive the buck section and the boost section such the buck duty cycle and the boost duty cycle are not substantially constant over the range of values. The buck duty cycle and the boost duty cycle may be functions of the input voltage over the range of values.

The buck section may comprise: a first transistor and a first diode coupled in parallel between the input node and the first end of the inductor; and a second transistor and a second diode coupled in parallel between the first end of the inductor and a reference voltage. The boost section may comprise: a third transistor and a third diode coupled in parallel between the output node and the second end of the inductor; and a fourth transistor and a fourth diode coupled in parallel between the second end of the inductor and the reference voltage. A gate of the first transistor may be coupled to a node that is operable to receive a first PWM signal having the buck duty cycle, and wherein a gate of the fourth transistor is coupled to a node that operable to receive a second PWM signal having the boost duty cycle.

While at least one exemplary embodiment has been presented in the foregoing detailed description, it should be appreciated that a vast number of variations exist, especially with respect to choices of device types and materials and the sequence of processes.

It should be emphasized that the exemplary embodiments described above are only examples, and are not intended to limit the scope, applicability, or configuration of the invention in any way. Rather, the detailed description of the exemplary embodiments provides those skilled in the art with a convenient road map for implementing the inventive principles contained in the exemplary embodiments. The subject matter of the invention includes all combinations and subcombinations of the various elements, features, functions and/or properties disclosed herein. It also should be understood that various changes can be made in the function and arrangement of elements without departing from the scope of the invention as set forth in the appended claims and the legal equivalents thereof.

The invention claimed is:

1. A method of mode transitioning, comprising the steps of:
driving a buck section of a DC/DC converter with a buck signal that has a buck duty cycle that is less than one while the DC/DC converter is in a buck/boost mode of operation;
concurrently with driving the buck section, driving a boost section of the DC/DC converter with a boost signal that has a non-zero boost duty cycle while the DC/DC converter is in the buck/boost mode of operation, a difference existing between the buck duty cycle and the boost duty cycle;
monitoring an input voltage that is coupled to the buck section for a change in the input voltage; and
in response to a change in the input voltage, changing the buck duty cycle and the boost duty cycle such that the difference between the buck duty cycle and the boost duty cycle is substantially constant over substantially an entire range of values of the input voltage that corresponds to the buck/boost mode of operation.

2. The method of claim 1, wherein the buck duty cycle comprises a first substantially linear function of the input voltage over the range of values.

3. The method of claim 2, wherein the boost duty cycle comprises a second substantially linear function of the input voltage over the range of values.

4. The method of claim 3, wherein driving the buck section comprises determining that the input voltage is substantially within the range of values.

5. The method of claim 4, wherein driving the boost section comprises determining that the input voltage is substantially within the range of values.

6. The method of claim 5, wherein the first and second substantially linear functions of the input voltage are the same regardless of whether the input voltage has an increasing trend or a decreasing trend.

7. A DC/DC converter, comprising:
a buck section, the buck section configured to receive an input voltage;
an inductor coupled to the buck section;
a boost section coupled to the inductor; and
a controller coupled to the buck and boost sections, the controller configured to monitor the input voltage for a change in the input voltage, and in response to the change in the input voltage, to control a buck duty cycle of the buck section and a boost duty cycle of the boost section during a buck/boost mode of operation such that a difference between the buck duty cycle and the boost duty cycle is substantially constant over substantially an entire range of values of the input voltage corresponding to the buck/boost mode of operation.

8. The DC/DC converter of claim 7, wherein the buck duty cycle and the boost duty cycle are functions of the input voltage over the range of values.

9. The DC/DC converter of claim 8, the controller comprising a driving signal generator coupled to the buck and boost sections, the driving signal generator operable to generate a buck driving signal in response to a buck duty cycle signal and a boost driving signal in response to a boost duty cycle signal.

10. The DC/DC converter of claim 9, the controller further comprising a duty cycle generator coupled to the driving signal generator, the duty cycle generator operable to generate the buck duty cycle signal and the boost duty cycle signal in response to a mode signal and a comp signal.

11. A DC/DC converter, comprising:
a buck section, the buck section configured to receive an input voltage;
an inductor coupled to the buck section;
a boost section coupled to the inductor; and
a controller coupled to the buck and boost sections, the controller configured to drive the buck section and the boost section during a buck/boost mode of operation such that a difference between a buck duty cycle and a boost duty cycle is substantially constant over a range of values of the input voltage, wherein the controller also is configured to drive the buck section and the boost section such that the buck duty cycle and the boost duty cycle are not substantially constant over the range of values of the input voltage, and the buck duty cycle and the boost duty cycle are functions of the input voltage over the range of values, and wherein
the controller comprises
a driving signal generator coupled to the buck and boost sections, the driving signal generator operable to generate a buck driving signal in response to a buck duty cycle signal and a boost driving signal in response to a boost duty cycle signal, a duty cycle generator coupled to the driving signal generator, the duty cycle generator operable to generate the buck duty cycle signal and the boost duty cycle signal in response to a mode signal and a comp signal, and a state machine coupled to the duty cycle generator, the state machine operable to generate the mode signal in response to the input voltage and an output voltage.

12. The DC/DC converter of claim 11, the controller further comprising an error amplifier coupled to the duty cycle generator, the error amplifier operable to generate the comp signal in response to the input voltage and the output voltage.

13. A DC/DC converter circuit for converting an input voltage applied at an input node to an output voltage at an output node, the DC/DC converter comprising:

a buck section coupled to the input node;

an inductor having a first end and a second end, the first end of the inductor coupled to the buck section;

a boost section coupled to a second end of the inductor; and a controller coupled to the buck section and the boost section, the controller configured to monitor the input voltage for a change in the input voltage, and in response to the change in the input voltage, to control a buck duty cycle of the buck section and a boost duty cycle of the boost section during a buck/boost mode of operation such that a difference between the buck duty cycle and the boost duty cycle is substantially constant over substantially an entire range of values for the input voltage that corresponds to a buck/boost mode of operation of the DC/DC converter.

14. The DC/DC converter of claim 13, wherein the buck duty cycle and the boost duty cycle are functions of the input voltage over the range of values.

15. The DC/DC converter of claim 13, the buck section comprising:

a first transistor and a first diode coupled in parallel between the input node and the first end of the inductor; and a second transistor and a second diode coupled in parallel between the first end of the inductor and a reference voltage.

16. The DC/DC converter of claim 15, the boost section comprising:

a third transistor and a third diode coupled in parallel between the output node and the second end of the inductor; and a fourth transistor and a fourth diode coupled in parallel between the second end of the inductor and the reference voltage.

17. The DC/DC converter of claim 16, wherein a gate of the first transistor is coupled to a node that is operable to receive a first PWM signal having the buck duty cycle, and wherein a gate of the fourth transistor is coupled to a node that operable to receive a second PWM signal having the boost duty cycle.

18. A method of mode transitioning, comprising the steps of:

driving a buck section of a DC/DC converter with a buck signal that has a buck duty cycle while the DC/DC converter is in a buck/boost mode of operation, wherein the buck duty cycle comprises a first linear function of an input voltage over substantially an entire range of values of the input voltage that corresponds to the buck/boost mode of operation;

concurrently with driving the buck section, driving a boost section of the DC/DC converter with a boost signal that has a boost duty cycle while the DC/DC converter is in the buck/boost mode of operation, a difference existing between the buck duty cycle and the boost duty cycle, wherein the boost duty cycle comprises a second linear function of the input voltage over substantially the entire range of values of the input voltage that corresponds to the buck/boost mode of operation;

monitoring an input voltage that is coupled to the buck section for a change in the input voltage; and in response to a change in the input voltage, changing the buck duty cycle and the boost duty cycle.

19. The method of claim 18, wherein the difference between the buck duty cycle and the boost duty cycle is maintained to be substantially constant over substantially the entire range of values of the input voltage that corresponds to the buck/boost mode of operation.

20. The method of claim 18, wherein the first linear function and the second linear function have a same slope direction over substantially the entire range of values of the input voltage that corresponds to the buck/boost mode of operation.

* * * * *